(12) United States Patent
Uchida et al.

(10) Patent No.: US 11,679,676 B2
(45) Date of Patent: Jun. 20, 2023

(54) DISPLAY SYSTEM AND VEHICLE INCLUDING THE SAME, AND METHOD OF SHOWING STATE OF SECONDARY BATTERY

(71) Applicant: TOYOTA JIDOSHA KABUSHIKI KAISHA, Toyota (JP)

(72) Inventors: Yoshihiro Uchida, Nagakute (JP); Nobuyuki Tanaka, Toyota (JP); Kazuki Kubo, Toyota (JP); Junta Izumi, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 342 days.

(21) Appl. No.: 16/937,740

(22) Filed: Jul. 24, 2020

(65) Prior Publication Data
US 2021/0061101 A1   Mar. 4, 2021

(30) Foreign Application Priority Data
Aug. 30, 2019  (JP) .............................. JP2019-158627

(51) Int. Cl.
  *B60K 35/00*   (2006.01)
  *B60Q 9/00*    (2006.01)
  *B60L 58/12*   (2019.01)

(52) U.S. Cl.
  CPC .............. *B60K 35/00* (2013.01); *B60L 58/12* (2019.02); *B60Q 9/00* (2013.01); *B60K 2370/152* (2019.05); *B60K 2370/171* (2019.05); *B60K 2370/33* (2019.05)

(58) Field of Classification Search
  CPC .............. B60K 35/00; B60K 2370/152; B60K 2370/171; B60K 2370/33; B60K 2370/1523; B60K 2370/169; B60K 2370/174; B60K 37/06; B60K 2370/52; B60L 58/12; B60L 3/12; B60L 2250/10; B60L 2250/16; B60Q 9/00; Y02E 60/10; Y02T 10/70; Y02T 10/84; H01M 10/488; G01R 31/3646; B60Y 2200/91
  See application file for complete search history.

(56) References Cited

U.S. PATENT DOCUMENTS

| | | | | |
|---|---|---|---|---|
| 5,422,822 A | * | 6/1995 | Toyota | G01R 31/382 |
| | | | | 324/432 |
| 2001/0022518 A1 | | 9/2001 | Asakura et al. | |
| 2013/0076366 A1 | * | 3/2013 | Arizono | H02J 7/0048 |
| | | | | 324/435 |
| 2014/0077941 A1 | * | 3/2014 | Yamamura | B60W 20/00 |
| | | | | 340/438 |

(Continued)

FOREIGN PATENT DOCUMENTS

| | | |
|---|---|---|
| DE | 10110642 A1 | 10/2001 |
| DE | 102017103710 A1 | 8/2017 |

(Continued)

*Primary Examiner* — Douglas M Wilson
(74) *Attorney, Agent, or Firm* — Sughrue Mion, PLLC

(57) ABSTRACT

In representation processing, when a capacity retention is higher than a threshold value while a warranty condition is satisfied, an ECU has the capacity retention shown in a first manner. When the capacity retention is equal to or lower than the threshold value while the warranty condition is satisfied, the ECU has the capacity retention shown in a second manner.

14 Claims, 13 Drawing Sheets

(56) References Cited

U.S. PATENT DOCUMENTS

| | | | | |
|---|---|---|---|---|
| 2015/0331055 A1* | 11/2015 | Oi | ........................ | G01R 31/005 |
| | | | | 702/63 |
| 2017/0176540 A1* | 6/2017 | Omi | ...................... | H01M 10/48 |
| 2017/0242079 A1 | 8/2017 | Duan et al. | | |
| 2019/0033396 A1* | 1/2019 | Karner | .................. | G06F 3/0484 |
| 2021/0323419 A1* | 10/2021 | Maruno | .............. | H01M 10/488 |

FOREIGN PATENT DOCUMENTS

| | | |
|---|---|---|
| EP | 2881749 B1 | 1/2017 |
| JP | 2009-208484 A | 9/2009 |
| JP | 2010-93875 A | 4/2010 |
| JP | 2011-257213 A | 12/2011 |
| JP | 2012-83317 A | 4/2012 |
| JP | 2013-186956 A | 9/2013 |
| JP | 2017-120270 A | 7/2017 |
| JP | 2019-33605 A | 2/2019 |
| KR | 10-2013-0134397 A | 12/2013 |
| WO | 2017/098686 A1 | 6/2017 |

* cited by examiner

DISPLAY SYSTEM AND VEHICLE INCLUDING THE SAME, AND METHOD OF SHOWING STATE OF SECONDARY BATTERY

This nonprovisional application is based on Japanese Patent Application No. 2019-158627 filed with the Japan Patent Office on Aug. 30, 2019, the entire contents of which are hereby incorporated by reference.

BACKGROUND

Field

The present disclosure relates to a display system and a vehicle including the same, and a method of showing a state of a secondary battery.

Description of the Background Art

A secondary battery as a motive power source has been mounted on a large number of recent electric appliances. The secondary battery has been known to deteriorate and become lower in full charge capacity as it is used and time elapses. When the full charge capacity becomes low, an electric appliance may be shorter in maximum continuous drive time, which may be great inconvenience to a user. Therefore, the full charge capacity is an important indicator for the user.

For example, in an electrically powered vehicle such as an electric vehicle including a secondary battery as a motive power source, with lowering in full charge capacity, a distance which the electrically powered vehicle can travel with electric power stored in the secondary battery (what is called an EV driving range) decreases. In order to eliminate user's anxieties, the full charge capacity may be shown. For example, Japanese Patent Laying-Open No. 2011-257213 discloses a display system that shows both of a state of charge (SOC) and a full charge capacity of a secondary battery.

SUMMARY

Some electrically powered vehicles are covered by a warranty from a manufacturer, of replacement of a secondary battery or processing for refreshing the secondary battery when deterioration of the secondary battery progresses and the full charge capacity is equal to or lower than a threshold value. A user of the electrically powered vehicle covered by the warranty can receive a warranty service for the secondary battery through a dealer or the like when the full charge capacity is equal to or lower than a threshold value.

In a general electric appliance including a secondary battery as a motive power source (for example, a smartphone familiar to a large number of users), an SOC as an indicator that indicates remaining power (remaining capacity) of the secondary battery is always shown. On the other hand, the full charge capacity is not always shown in many electric appliances. Therefore, a large number of users are not familiar with the full charge capacity. Accordingly, even though both of the SOC and the full charge capacity are shown on a display screen of an electrically powered vehicle as in the display system disclosed, for example, in Japanese Patent Laying-Open No. 2011-257213, a user may not be able to intuitively recognize in which condition of the shown full charge capacity the battery is eligible for receiving a warranty service.

The present disclosure was made to solve the problems above, and an object thereof is to allow a user to readily intuitively recognize eligibility for receiving a warranty service for a secondary battery.

(1) A display system according to the present disclosure includes a display apparatus that shows a first indicator relating to a full charge capacity of a secondary battery and a controller that controls the display apparatus. The controller controls the display apparatus to notify, when a full charge capacity of the secondary battery is equal to or lower than a threshold value, that the full charge capacity of the secondary battery is equal to or lower than the threshold value.

According to the above configuration, when the full charge capacity of the secondary battery is equal to or lower than the threshold value, a notification that the full charge capacity of the secondary battery is equal to or lower than the threshold value is given. In other words, when the secondary battery is now eligible for receiving a warranty service, a notification that the secondary battery is eligible for receiving the warranty service is given. A user can thus intuitively recognize eligibility for receiving a warranty service for the secondary battery.

(2) In one embodiment, the controller controls the display apparatus to notify that the full charge capacity of the secondary battery is equal to or lower than the threshold value by varying a manner of representation of the first indicator.

According to the above configuration, when the secondary battery is now eligible for receiving the warranty service, a manner of representation of the first indicator is varied. With variation in manner of representation of the first indicator, the user can intuitively recognize eligibility for receiving the warranty service for the secondary battery.

(3) In one embodiment, the controller controls the display apparatus to notify that the full charge capacity of the secondary battery is equal to or lower than the threshold value by showing a warning.

According to the configuration, when the secondary battery is now eligible for receiving the warranty service, a warning is shown. With representation of the warning, the user can intuitively recognize eligibility for receiving the warranty service for the secondary battery.

(4) In one embodiment, the controller controls the display apparatus to notify, when an estimation error of the full charge capacity of the secondary battery exceeds a reference value, that accuracy of the first indicator is low.

Environments where the full charge capacity of the secondary battery is estimated are various, and the full charge capacity of the secondary battery is not necessarily estimated in a stable environment. Therefore, there are various factors that may vary an estimated value of the full charge capacity. When an estimation error of the full charge capacity is large, the first indicator shown at each estimation timing may greatly be varied, which may make a user feel strange. According to the above configuration, when the estimation error of the full charge capacity exceeds the reference value, a notification about low accuracy of the first indicator is given. The user can thus recognize low accuracy of the first, indicator. Therefore, even though the first indicator shown at each estimation timing is greatly varied, strange feeling felt by the user can be lessened as compared with an example where the user is not aware of low accuracy of the first indicator.

(5) In one embodiment, the display apparatus shows a capacity retention in segment representation as the first indicator, the capacity retention representing a ratio of a current full charge capacity to an initial full charge capacity of the secondary battery. The controller controls the display apparatus to turn on segments corresponding in number to the capacity retention. The controller controls the display apparatus to vary a color of at least one of the segments when the full charge capacity of the secondary battery is equal to or lower than the threshold value.

According to the above configuration, when the full charge capacity of the secondary battery is equal to or lower than the threshold value, a color of a segment is varied. The user can thus intuitively recognize eligibility for receiving the warranty service for the secondary battery.

(6) In one embodiment, the controller controls the display apparatus to notify that the full charge capacity of the secondary battery is equal to or lower than the threshold value when a warranty condition is satisfied, and controls the display apparatus not to notify that the full charge capacity of the secondary battery is equal to or lower than the threshold value when the warranty condition is not satisfied.

(7) In one embodiment, the warranty condition is satisfied when a prescribed period has not elapsed since start of use of the secondary battery.

(8) In one embodiment, the warranty condition is satisfied when a travel distance of a vehicle incorporating the secondary battery is shorter than a prescribed distance.

(9) In one embodiment, the warranty condition is satisfied when a prescribed period has not elapsed since start of use of the secondary battery and when a travel distance of a vehicle incorporating the secondary battery is shorter than a prescribed distance.

The warranty service for the secondary battery may be conditioned on fulfillment of a warranty condition. In such a case, when a notification that the full charge capacity of the secondary battery is equal to or lower than the threshold value is given even though the warranty condition is not satisfied, the user may erroneously recognize eligibility for receiving the warranty service or may feel bothered by the notification given in spite of ineligibility for receiving the warranty service. According to the configuration in (6) to (9), when the warranty condition is satisfied, a notification that the full charge capacity of the secondary battery is equal to or lower than the threshold value is given. When the warranty condition is not satisfied, however, the notification is not given. Since the notification is thus not given when the secondary battery is not eligible for receiving the warranty service, erroneous recognition by the user caused by the notification or the user being bothered by the notification can be suppressed.

(10) In one embodiment, the controller controls the display apparatus to notify, when a warranty condition is not satisfied, that the warranty condition is not satisfied.

According to the above configuration, the user can recognize that the warranty condition is not satisfied and the secondary battery is not eligible for receiving the warranty service.

(11) In one embodiment, the controller controls the display apparatus to show a second indicator indicating a warranty condition.

For example, a prescribed period and/or a prescribed distance that represent(s) a warranty condition can be shown as the second indicator. Instead of the prescribed period, remaining days or a date on which a prescribed period expires may be shown as the second indicator. Furthermore, instead of the prescribed distance, a distance that remains until the prescribed distance may be shown as the second indicator. By showing the second indicator, for example, expiration of a prescribed period or excess over a prescribed distance in spite of the fact that the secondary battery is eligible for receiving the warranty service can be suppressed.

(12) A vehicle according to another aspect of the present disclosure includes a secondary battery and the display system described in any of (1) to (11).

According to the above configuration, representation that allows a user to intuitively recognize eligibility for receiving the warranty service for the secondary battery can be realized in a vehicle.

(13) In a method of showing, a state of a secondary battery according to yet another aspect of the present disclosure, a first indicator relating to a full charge capacity of the secondary battery is shown. The method of showing a state of a secondary battery includes obtaining a full charge capacity of the secondary battery and notifying, when the full charge capacity of the secondary battery is equal to or lower than a threshold value, that the full charge capacity of the secondary battery is equal to or lower than the threshold value.

The foregoing and other objects, features, aspects and advantages of the present disclosure will become more apparent from the following detailed description of the present disclosure when taken in conjunction with the accompanying drawings.

DESCRIPTION OF THE PREFERRED EMBODIMENTS

Figure 1:
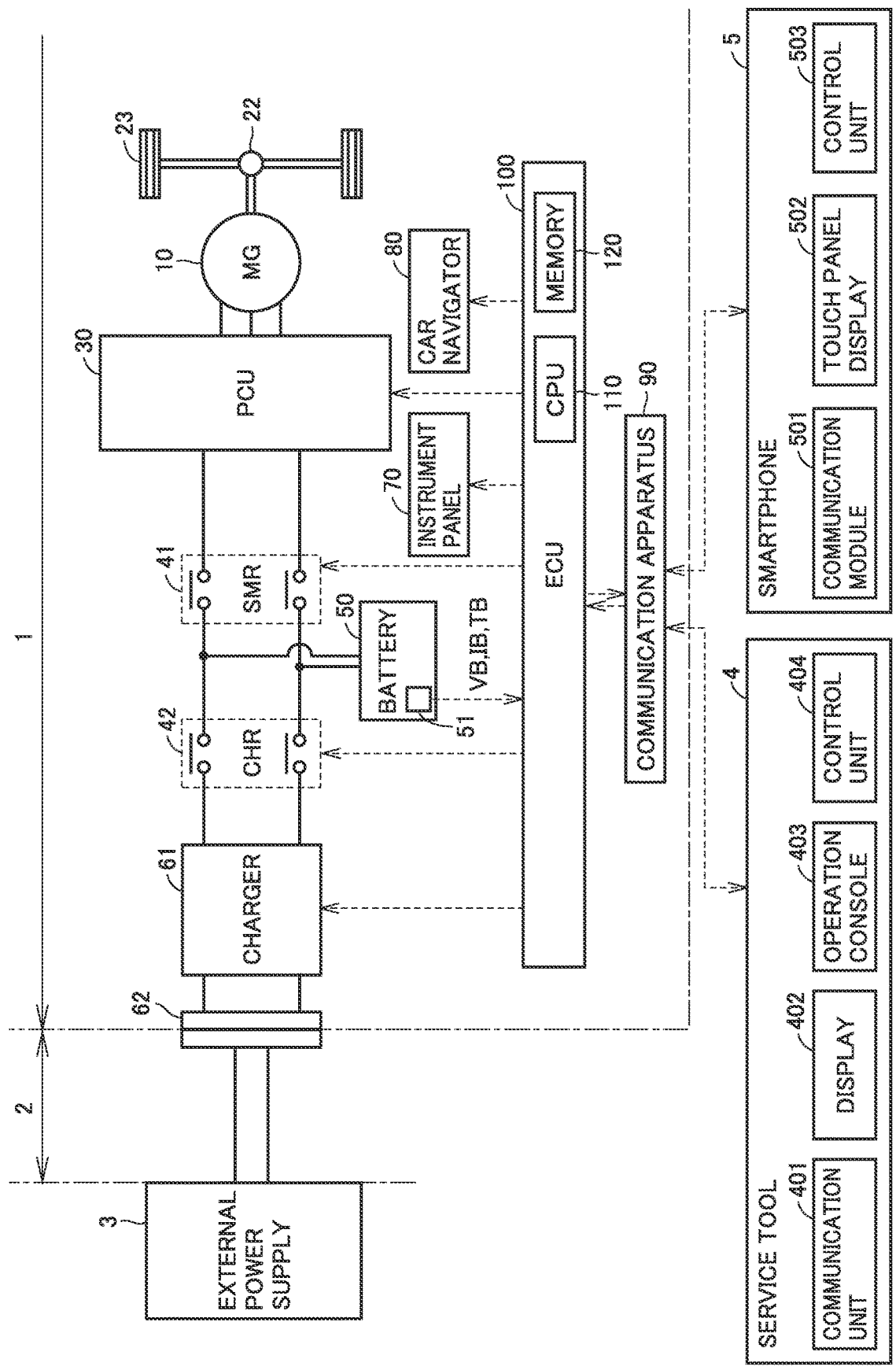
FIG. 1 is a diagram schematically showing an overall configuration of a system including a vehicle according to an embodiment.

An embodiment of the present disclosure will be described below in detail with reference to the drawings. The same or corresponding elements in the drawings have the same reference characters allotted and description thereof will not be repeated.

Overall Configuration

FIG. 1 is a diagram schematically showing an overall configuration of a system including a vehicle according to the present embodiment. A vehicle 1 according to the present embodiment is an externally chargeable electric vehicle in which a vehicle-mounted secondary battery is charged with electric power supplied from a power supply outside the vehicle (which is also referred to as an "external power supply" below). Vehicle 1 should only incorporate a secondary battery as a motive power source, and is not limited to an electric vehicle. Vehicle 1 may be, for example, a plug-in hybrid vehicle, a hybrid vehicle, or a fuel cell vehicle.

Referring to FIG. 1, vehicle 1 includes a motor generator 10, a transmission gear 22, a drive wheel 23, a power control unit (PCU) 30, a system main relay (SMR) 41, a battery 50, an instrument panel 70, a car navigation system (car navigator) 80, a communication apparatus 90, and an electronic control unit (ECU) 100. Vehicle 1 includes a charge relay 42, a charger 61, and an inlet 62 as components for external charging.

Motor generator (three-phase alternating-current (AC) motor) 10 generates kinetic energy for running vehicle 1 by receiving AC power from PCU 30. Kinetic energy generated by motor generator 10 is transmitted to drive wheel 23. On the other hand, motor generator 10 converts kinetic energy of vehicle 1 into electric energy when vehicle 1 is decelerated or stopped. AC power generated by motor generator 10 is converted to direct-current (DC) power by PCU 30 and supplied to battery 50. Regenerative power can thus be stored in battery 50. Motor generator 10 is thus configured to generate driving force or braking force of vehicle 1 by transmitting and receiving electric power to and from battery 50 (that is charging and discharging of battery 50).

When vehicle 1 is configured as a hybrid vehicle which further incorporates an engine (not shown) as a motive power source, output from the engine in addition to output from motor generator 10 can be used as driving force for travel. Alternatively, an additional motor generator (not shown) which generates power based on output from the engine can also further be incorporated to generate charging power for battery 50 based on output from the engine.

PCU 30 converts DC power stored in battery 50 into AC power and supplies AC power to motor generator 10 in response to a control signal from ECU 100. PCU 30 converts AC power generated by motor generator 10 to DC power and supplies DC power to battery 50.

SMR 41 is electrically connected to a power line that connects PCU 30 and battery 50 to each other. SMR 41 switches between supply and cut-off of electric power between PCU 30 and battery 50 in response to a control signal from ECU 100.

Battery 50 is a DC power supply that is chargeable and dischargeable. A secondary battery such as a lithium ion secondary battery or a nickel metal hydride battery can be employed as battery 50. Battery 50 supplies electric power for generating driving force of vehicle 1 to PCU 30. Battery 50 stores electric power generated by motor generator 10.

Battery 50 includes a monitoring unit 51 that monitors a state of battery 50. Monitoring unit 51 includes a voltage sensor that detects a voltage VB of battery 50, a current sensor that detects a current IB input to and output from battery 50, and a temperature sensor that detects a temperature TB of battery 50 (none of which is shown). Each sensor outputs a signal indicating a result of detection to ECU 100. ECU 100 can calculate an SOC of battery 50 and/or calculate a full charge capacity of battery 50 based on a result of detection received from monitoring unit 51.

Charge relay 42 is electrically connected to a power line that connects battery 50 and charger 61 to each other. Charge relay 42 switches between supply and cut-off of electric power between battery 50 and charger 61 in response to a control signal from ECU 100.

Charger 61 includes, for example, an AC/DC converter (not shown). Charger 61 converts AC power supplied from an external power supply 3 through a charging cable 2 to DC power and outputs DC power to battery 50.

Figure 2:
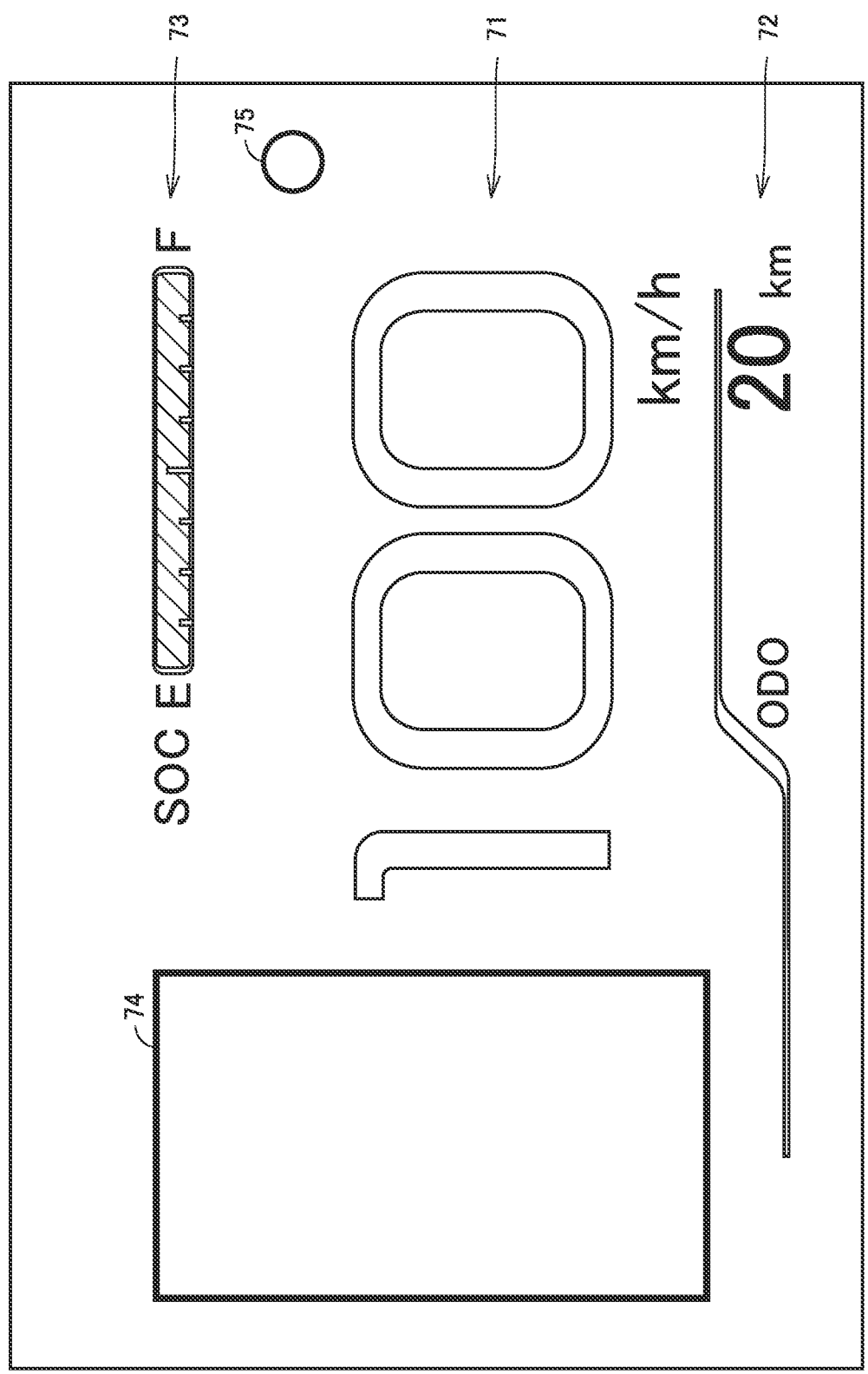
FIG. 2 is a diagram for illustrating an instrument panel.

Instrument panel 70 shows various states of vehicle 1 under the control by ECU 100. FIG. 2 is a diagram for illustrating instrument panel 70. Referring to FIG. 2, instrument panel 70 includes a speed display section 71 where a speed of vehicle 1 is shown, a trip display section 72 where a travel distance of vehicle 1 is shown, and a remaining capacity display section 73 where an SOC as an indicator that indicates remaining power (remaining capacity) of the battery is shown. In FIG. 2, 100 km/h is shown in speed display section 71 by way of example. In FIG. 2, 20 km is shown in trip display section 72 by way of example. In FIG. 2, an SOC of 100% is shown in remaining capacity display section 73 by way of example. The SOC represents a current amount of stored power to the full charge capacity of battery 50 in percentage.

Instrument panel 70 includes a multi-information display 74 and a warranty lamp 75, and a user can select contents to be shown in the multi-information display. The user can have multi-information display 74 selectively show, for example, a full charge capacity (a capacity retention in an example which will be described later) of battery 50, a driving range, an average vehicle speed, and a state of regeneration/power running of battery 50.

Figure 3:
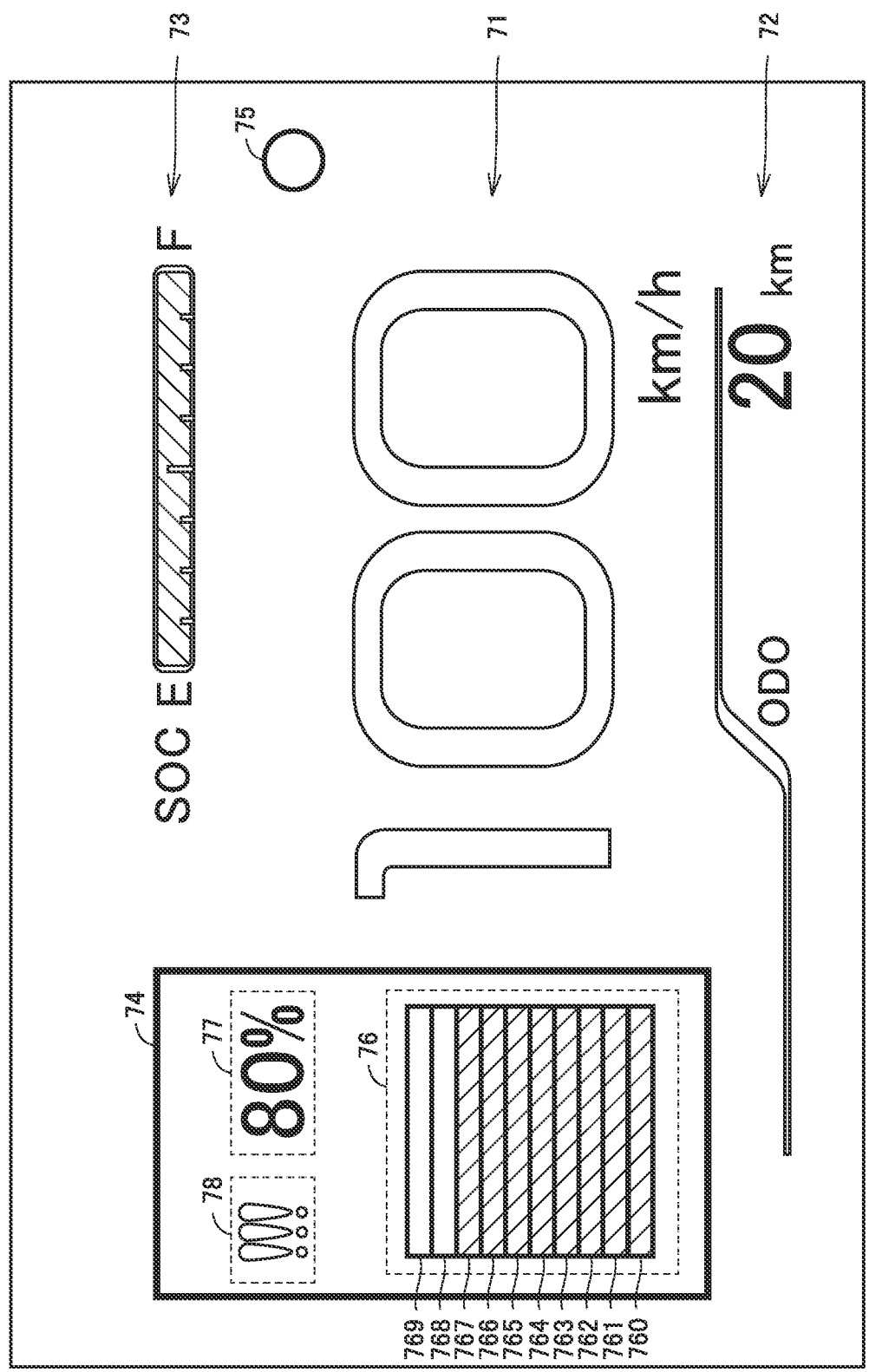
FIG. 3 is a diagram (No. 1) showing an example where a capacity retention is shown on a multi-information display.

FIG. 3 is a diagram showing an example where a capacity retention Q is shown on multi-information display 74. Capacity retention Q represents a ratio [unit of %] of a current full charge capacity C of battery 50 to a full charge capacity C0 in an initial state of battery 50 and it is calculated in an expression (1) below. In the present embodiment, capacity retention Q is shown as an indicator (a first indicator) relating to the full charge capacity of battery 50. Multi-information display 74 may show current full charge capacity C instead of capacity retention Q. In this case, multi-information display 74 shows, for example, current full charge capacity C and full charge capacity C0 in the initial state of battery 50.

$$Q = C/C0 \times 100 \quad (1)$$

A full charge capacity measured at the time of manufacturing of battery 50 (or vehicle 1) or a specification value (a catalog value) of the full charge capacity of battery 50 may be employed as initial value C0 of the full charge capacity.

Referring to FIG. 3, for showing capacity retention Q, multi-information display 74 includes a first display section 76, a second display section 77, and a third display section 78.

First display section 76 provides segment representation of capacity retention Q. In first display section 76, capacity retention Q is shown with ten segments 760 to 769 that constitute a scale. Specifically, one segment represents 10% capacity retention Q. On and off of each of segments 760 to 769 (virtual on and off based on an image in the present embodiment) is controlled in accordance with a control signal from ECU 100. With lowering in capacity retention Q, segments 760 to 769 are turned off sequentially from a side of segment 769. For example, when capacity retention Q of battery 50 lowers by a unit quantity (10%) from the state that all of segments 760 to 769 are on (capacity retention of 100%), segment 769 is turned off. FIG. 3 shows an example where capacity retention Q is 80%. Therefore, segments 768 and 769 are turned off and segments 760 to 767 are turned on. In first display section 76, the number of segments is not limited to ten but any number of segments not smaller than two may be set. For example, ten or more segments may be provided.

Second display section 77 shows capacity retention Q with a numeric value (80% in FIG. 3). A unit quantity of capacity retention Q shown in second display section 77 may be smaller (for example, 1%) than a unit quantity of capacity retention Q shown in first display section 76.

Third display section 78 shows an accuracy lamp for giving a notification about low accuracy in estimation of capacity retention Q. The accuracy lamp is turned on and off based on a control signal from ECU 100. The accuracy lamp is turned on when an estimation error of capacity retention Q is larger than a reference value. The accuracy lamp is turned off when the estimation error of capacity retention Q is equal to or smaller than the reference value. Details of the accuracy lamp will be described later.

Warranty lamp 75 is turned on and off based on a control signal from ECU 100. Warranty lamp 75 is turned off in a state of being ineligible for receiving a warranty battery service (which will be described later) and turned on in a state of being eligible for receiving the warranty battery service.

Referring again to FIG. 1, car navigator 80 includes a global positioning system (GPS) receiver that identifies a position of vehicle 1 based on radio waves from an artificial satellite and a monitor with a touch panel that accepts an operation by a user and shows various types of information (neither of which is shown).

Communication apparatus 90 can establish wired or wireless bidirectional communication with a service tool 4. Communication apparatus 90 can establish bidirectional communication also with a smartphone 5 of a user.

ECU 100 includes a central processing unit (CPU) 110, a memory 120, and an input and output port (not shown). ECU 100 may be divided into a plurality of ECUs for each function. Memory 120 includes a read only memory (ROM) and a random access memory (RAM), and stores a program executed by ECU 100 and a map used for various types of control. CPU 110 develops a program stored in the ROM on the RAM and executes the program. CPU 110 outputs a control signal based on a signal from each sensor and a map stored in memory 120 and controls each component to set vehicle 1 to a desired state.

Examples of primary control by ECU 100 in the present embodiment include "calculation processing" for calculating an SOC, a full charge capacity, and a capacity retention of battery 50 and "representation processing" for showing the calculated capacity retention on instrument panel 70. Calculation processing and representation processing will be described in detail later.

Service tool 4 is a dedicated terminal installed in a dealer, a service garage, or the like, and diagnoses whether or not vehicle 1 is in an abnormal condition (including a state of battery 50). More specifically, service tool 4 includes a communication unit 401, a display 402, an operation console 403, and a control unit 404. Control unit 404 diagnoses whether or not vehicle 1 is in an abnormal condition by establishing necessary communication with vehicle 1 through communication unit 401 in accordance with an operation onto operation console 403 by a serviceperson, and has display 402 show a result of diagnosis.

Smartphone 5 includes a communication module 501, a touch panel display 502, and a control unit 503. Control unit 503 can have touch panel display 502 show various types of information on vehicle 1 by communicating with vehicle 1 through communication module 501 or can accept an operation by a user onto touch panel display 502.

Instrument panel 70 corresponds to an exemplary "display apparatus" according to the present disclosure. ECU 100 corresponds to an exemplary "controller" according to the present disclosure. The "display apparatus" according to the present disclosure is not limited to instrument panel 70, and it may be car navigator 80 or a display apparatus provided separately in vehicle 1.

Warranty of Battery

Vehicle 1 according to the present embodiment configured as above is covered by a warranty (a battery warranty) offered by a manufacturer for replacement of battery 50. A secondary battery has been known to deteriorate and lower in full charge capacity as it is used and time elapses. In other words, as the secondary battery is used and time elapses, the capacity retention lowers. When battery 50 deteriorates and the capacity retention lowers (the full charge capacity lowers), a maximum EV driving range is shorter. When the EV driving range is shorter, the vehicle cannot travel over a long distance without external charging and convenience of a user is significantly impaired.

Therefore, the battery is covered by a warranty, for example, such that battery 50 is replaced by a manufacturer through a dealer or the like when deterioration of battery 50 progresses and capacity retention Q is equal to or lower than a threshold value. Contents of the battery warranty are not limited to replacement of battery 50, and for example, battery 50 of which deterioration has progressed may be refreshed. Refresh processing for battery 50 may be, for example, such processing, for recovering the capacity of battery 50 by discharging battery 50 until an SOC of battery 50 attains to a reference SOC and maintaining the SOC of battery 50 at an SOC not higher than the reference SOC for a certain period of time. Alternatively, refresh processing for battery 50 may be, for example, such processing for recovering the capacity of battery 50 by replacing a part of battery 50.

The threshold value is set, for example, to a value at which replacement of battery 50 is recommended, from a point of view of the EV driving range (for example, the EV driving range when battery 50 is fully charged). Alternatively, the threshold value may be set, for example, to a value at which refresh processing for battery 50 is recommended from a point of view of the EV driving range. The threshold value according to the present embodiment is set to a capacity retention of 30%. The threshold value is not limited to the capacity retention of 30% and may be set, for example, to a value higher or lower than the capacity retention of 30%.

The threshold value is not limited to a threshold value set for capacity retention Q. For example, the threshold value may be set for full charge capacity C of battery 50. Since full charge capacity C is in proportion to capacity retention Q (see the expression (1) above), the threshold value may be set for full charge capacity C, and the battery may be eligible for receiving a warranty battery service when the full charge capacity is equal to or lower than the threshold value.

In order to be eligible for receiving the warranty battery service, however, a warranty condition to be eligible for receiving the warranty service should be satisfied. The warranty condition is satisfied, for example, when both of (i) a condition that a period of ten years (which is also referred to as a "warranty period" below) since start of use of the secondary battery has not elapsed and (ii) a condition that there is no excess over one hundred and fifty thousand miles of travel distance (which is also referred to as a "warranty distance" below) are satisfied. In other words, when capacity retention Q of battery 50 is equal to or lower than the threshold value by the time of lapse of the warranty period and by the time the vehicle travels the warranty distance, the battery is eligible for receiving the warranty battery service. When the warranty period has elapsed or there is an excess over the warranty distance, the battery is not eligible for receiving the warranty battery service even though capacity retention Q of battery 50 is equal to or lower than the threshold value.

The warranty period refers to a period for which capacity retention Q of battery 50 higher than the threshold value is guaranteed, and it is derived, for example, from statistics and/or specifications of battery 50. Count of the warranty period starts, for example, on a day of new vehicle registration of vehicle 1. In other words, the warranty period refers to a period of ten years from the day of new vehicle registration of vehicle 1. Alternatively, count of the warranty period may start, for example, on the day of manufacturing of battery 50 or the day of manufacturing of vehicle 1. The warranty period is not limited to ten years from start of use of the secondary battery, and the warranty period may be shorter or longer than ten years from start of use of the secondary battery.

The warranty distance refers to a distance up to which capacity retention Q of battery 50 higher than the threshold value is guaranteed, and it is derived, for example, from statistics and/or specifications of battery 50. The warranty distance is not limited to one hundred and fifty thousand miles, but may be shorter or longer than one hundred and fifty thousand miles.

In summary, the battery is eligible for receiving the warranty battery service "when the warranty condition is satisfied and capacity retention Q is equal to or lower than the threshold value." "When the warranty condition is satisfied and capacity retention Q is higher than the threshold value" or "when the warranty condition is not satisfied," the battery is not eligible for receiving, the warranty battery service.

In a general electric appliance including a secondary battery as a motive power source (for example, a smartphone familiar to a large number of users), an SOC as an indicator that indicates remaining power of the secondary battery is always shown. On the other hand, the capacity retention (or the full charge capacity) is not always shown in many electric appliances. Therefore, a large number of users are not familiar with the capacity retention (full charge capacity). Accordingly, even though capacity retention Q is shown, for example, on instrument panel 70, the user may not be able to intuitively recognize in which condition of shown full charge capacity Q the battery is eligible for receiving the warranty battery service.

Vehicle 1 according to the present embodiment notifies that the battery is eligible for receiving the warranty battery service when deterioration of battery 50 progresses and the battery is now eligible for receiving the warranty battery service. Specifically, when the warranty condition is satisfied and capacity retention Q is equal to or lower than the threshold value, vehicle 1 according to the present embodiment varies a manner of representation of capacity retention Q shown on multi-information display 74 of instrument panel 70. With variation in manner of representation of capacity retention Q, the user can intuitively recognize eligibility for receiving the warranty battery service, that is, battery 50 can be replaced (or battery 50 can be refreshed).

Alternatively, when the warranty condition is satisfied and capacity retention Q is equal to or lower than the threshold value, a warning may be shown on instrument panel 70. Specifically, warranty lamp 75 may be turned on when the warranty condition is satisfied and capacity retention Q is equal to or lower than the threshold value. With turn-on of warranty lamp 75 as well, the user can intuitively recognize eligibility for receiving the warranty battery service. Instead of warranty lamp 75, a character may be shown, for example, on multi-information display 74.

When the warranty condition is satisfied and capacity retention Q is equal to or lower than the threshold value, a manner of representation of capacity retention Q shown on multi-information display 74 of instrument panel 70 may be varied and additionally warranty lamp 75 may be turned on. Thus, the user can more intuitively recognize eligibility for receiving the warranty battery service.

Figure 4:
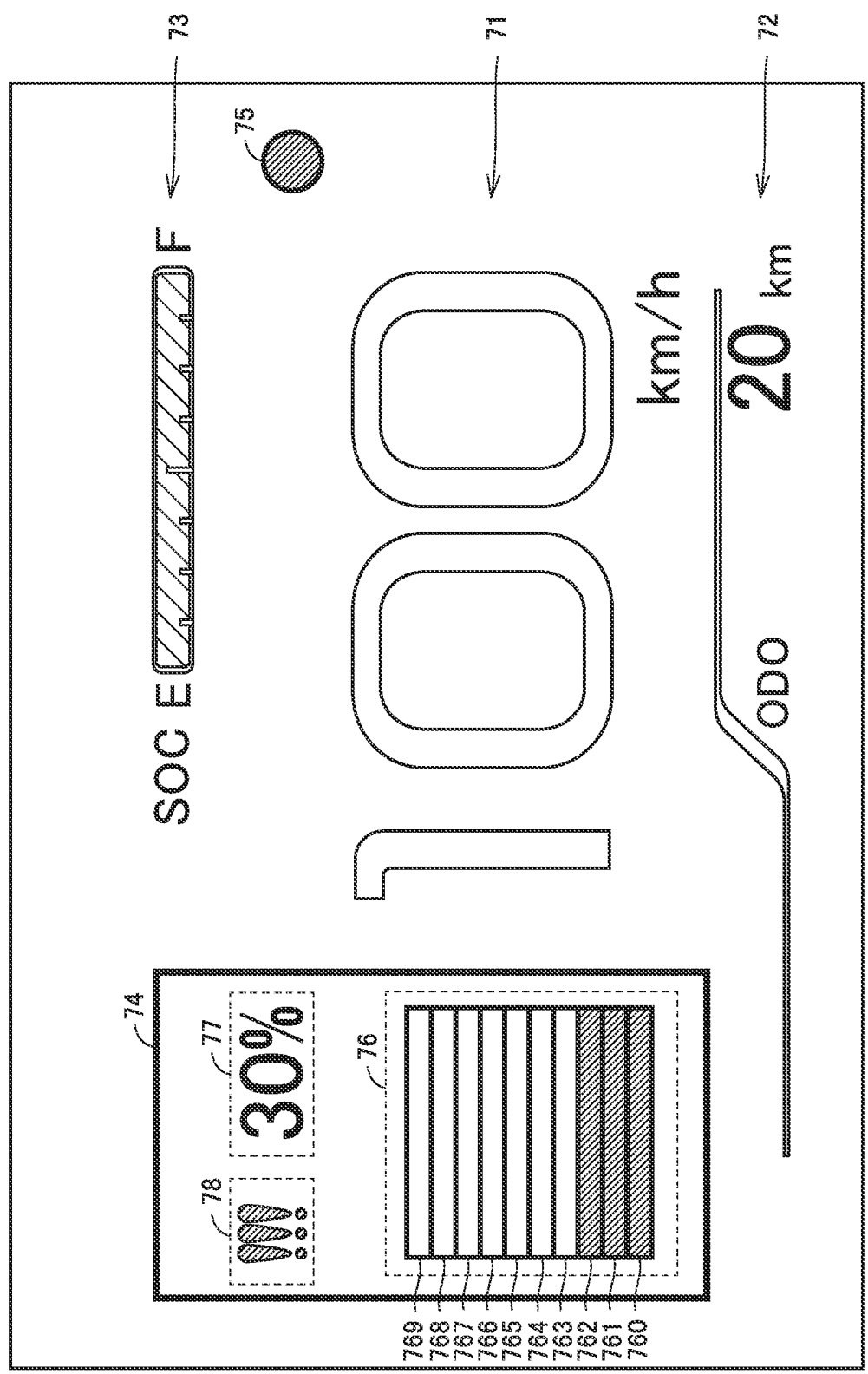
FIG. 4 is a diagram (No. 2) showing an example where a capacity retention is shown on the multi-information display.

Variation in manner of representation of capacity retention Q and warranty lamp 75 will be described with reference to FIGS. 3 and 4. FIG. 4 is a diagram showing an example where capacity retention Q is shown on multi-information display 74. FIG. 4 shows capacity retention Q shown on multi-information display 74 when the warranty condition is satisfied and capacity retention Q is equal to or lower than the threshold value. FIG. 3 shows capacity retention Q shown on multi-information display 74 when the warranty condition is satisfied and capacity retention Q is higher than the threshold value. As described above, the threshold value according to the present embodiment is set to the capacity retention of 30%. Namely, when capacity retention Q of battery 50 is equal to or lower than 30% while the warranty condition is satisfied, the battery is eligible for receiving the warranty battery service.

Referring to FIGS. 3 and 4, capacity retention Q is shown in first display section 76 of multi-information display 74 by turn-on of segments corresponding in number to capacity retention Q as described above. For example, in the example in FIG. 3 where capacity retention Q is 80%, segments 760 to 767 are turned on and segments 768 and 769 are turned off.

So long as the warranty condition is satisfied, colors of illumination of segments are different between capacity retention Q of battery 50 being higher than the threshold value and capacity retention Q being equal to or lower than the threshold value. In other words, when capacity retention Q is equal to or lower than the threshold value while the warranty condition is satisfied, the color of illumination of segments is varied.

By way of example, when capacity retention Q is 80% (FIG. 3), the color of illumination of segments is set to blue. When capacity retention Q is 30% (FIG. 4), the color of illumination of segments is set to red. Setting of the color of illumination of segments is merely by way of example. The color of illumination of segments can be set as appropriate.

When deterioration of battery 50 progresses and capacity retention Q is equal to or lower than the threshold value (when the battery is eligible for receiving the warranty battery service), the color of illumination of segments is varied from blue to red. The user can thus visually recognize variation in representation. Therefore, the user can intuitively recognize eligibility for receiving the warranty battery service.

Alternatively, when deterioration of battery 50 progresses and capacity retention Q is equal to or lower than the threshold value, warranty lamp 75 may be turned on. FIG. 3 shows an example where warranty lamp 75 is turned off and FIG. 4 shows an example where warranty lamp 75 is turned on. As warranty lamp 75 is turned on when the battery is eligible for receiving the warranty battery service, the user can visually recognize variation in representation. Therefore, the user can intuitively recognize eligibility for receiving the warranty battery service.

When the battery is eligible for receiving the warranty battery service, the color of illumination of segments may be varied and warranty lamp 75 may be turned on. Based on such combination, the user can more intuitively recognize eligibility for receiving the warranty battery service.

When the warranty condition is not satisfied, the battery is not eligible for receiving the warranty battery service even though capacity retention Q is equal to or lower than the threshold value. If a notification that capacity retention Q is equal to or lower than the threshold value is given even in such a case, the user may erroneously recognize eligibility for receiving the warranty service or may feel bothered by the notification given in spite of ineligibility for receiving the warranty service. Then, when the warranty condition is not satisfied, a notification that capacity retention Q is equal to or lower than the threshold value is not given even though capacity retention Q is equal to or lower than the threshold value. Thus, erroneous recognition by the user caused by the notification or the user being bothered by the notification can be suppressed.

Environments (for example, temperature TB of battery 50, though details will be described later) where capacity retention Q is estimated are various, and the capacity retention is not necessarily always estimated in a stable environment. Therefore, there are various factors that may vary an estimated value of capacity retention Q. When an estimation error of capacity retention Q is large, for example, there is a concern as below. Capacity retention Q (first display section 76 and second display section 77) shown on multi-information display 74 at each timing of estimation of capacity retention Q may greatly fluctuate, which may make a user feel strange. Alternatively, although capacity retention Q shown on multi-information display 74 is equal to or lower than the threshold value, at next timing of estimation of capacity retention Q, capacity retention Q may be higher than the threshold value. Alternatively, an example is also possible in which, since capacity retention Q shown on multi-information display 74 is equal to or lower than the threshold value, a user brings his/her vehicle 1 immediately to a dealer, but when capacity retention Q is estimated by service tool 4 in a stable environment, capacity retention Q is higher than the threshold value.

Then, when an estimation error of capacity retention Q is large, third display section 78 is turned on to give a notification to a user. As third display section 78 is turned on, the user can recognize that accuracy of currently shown capacity retention Q may be low and representation may not be accurate. Thus, even though capacity retention Q shown at each estimation timing fluctuates, strange feeling felt by the user can be lessened as compared with an example where the user is unaware of low accuracy of shown capacity retention Q. Calculation of an estimation error of capacity retention Q will be described with reference to FIG. 5.

Calculation Processing and Representation Processing

<<Calculation Processing>>

Figure 5:
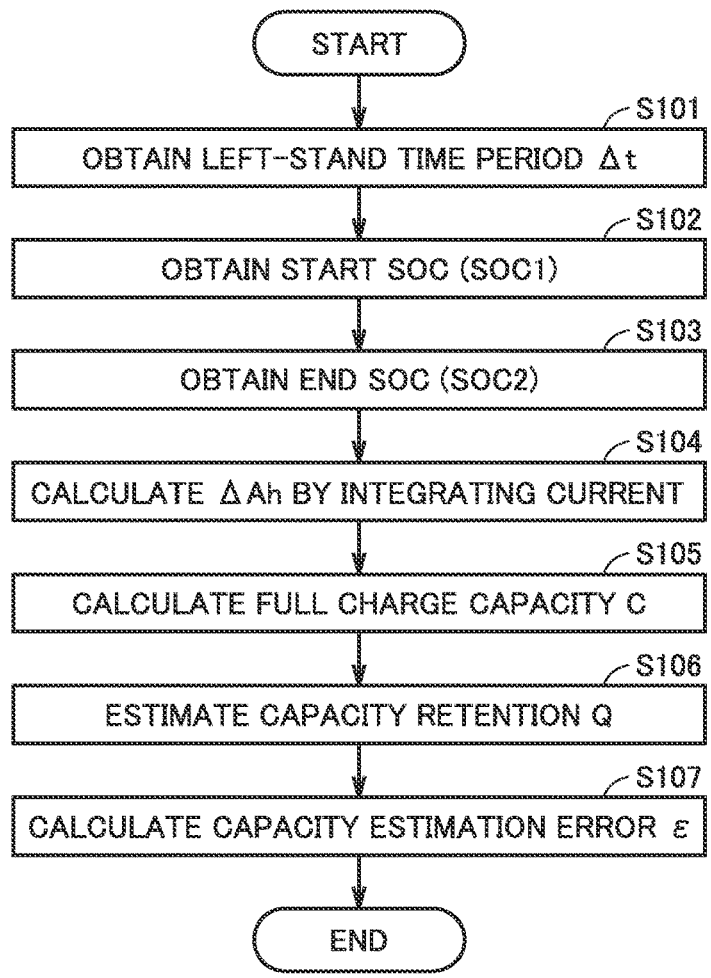
FIG. 5 is a flowchart showing calculation processing in the embodiment.

FIG. 5 is a flowchart showing calculation processing in the present embodiment. This flowchart is performed by ECU 100, for example, when a prescribed condition is satisfied (for example, when a defined time period has elapsed since previous estimation of capacity retention Q). Though each step (the step being abbreviated as "S" below) included in this flowchart and FIG. 9 which will be described later is basically performed by software processing by ECU 100, it may be performed by dedicated hardware (electric circuitry) fabricated in ECU 100.

Referring to FIG. 5, processing from S101 to S107 is processing for calculating a capacity retention of battery 50 and an estimation error thereof (calculation processing).

In S101, ECU 100 obtains a left-stand time period $\Delta t$ of battery 50. Left-stand time period $\Delta t$ (which is also called a stand-by time period) means a time period for which battery 50 was left stand without being charged or discharging before start of the flow (that is, a time period elapsed since previous charging and discharging of battery 50).

In S102, ECU 100 calculates an SOC of battery 50. This SOC is referred to as a "start SOC" and denoted also as an SOC1. A known method of finding an SOC based on an OCV by referring to an OCV-SOC curve of battery 50 obtained in advance can be employed as a method of estimating the start SOC.

In S103, ECU 100 calculates again the SOC of battery 50. This SOC is referred to as an "end SOC" and denoted also as an SOC2.

In S104, ECU 100 calculates an amount of charging, and discharging power $\Delta Ah$ in charging and discharging of battery 50 during a period from estimation of the start SOC until estimation of the end SOC. Amount of power $\Delta Ah$ can be calculated by integrating a value of a current that flows in battery 50, with the use of the current sensor included in monitoring unit 51. A unit for amount of charging and discharging power $\Delta Ah$ is not limited to ampere-hour but may be watt-hour.

In S105, ECU 100 calculates full charge capacity C of battery 50. Specifically, ECU 100 can calculate full charge capacity C of battery 50 in accordance with an expression (2) below, based on the SOC1 and the SOC2 representing results in two calculations of the SOC and amount of charging and discharging power $\Delta Ah$.

$$C = \Delta Ah / |SOC1 - SOC2| \times 100 \qquad (2)$$

In S106, ECU 100 estimates capacity retention Q of battery 50. Capacity retention Q of battery 50 is calculated by dividing full charge capacity C by an initial value C0 of the full charge capacity of battery 50 as described with reference to the expression (1).

In S107, ECU 100 calculates an error $\varepsilon$ of capacity retention Q estimated in S106 (a capacity estimation error).

Figure 6:
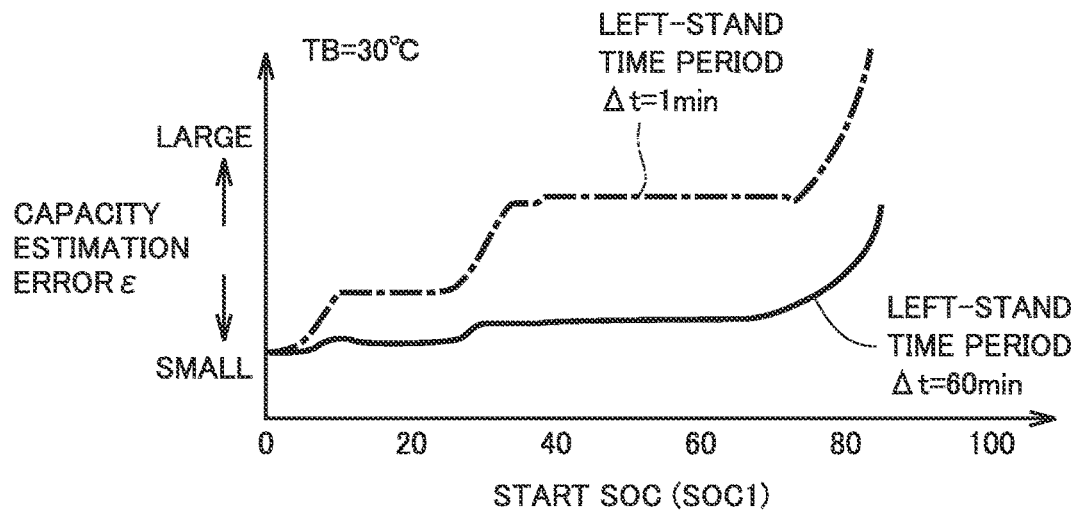
FIG. 6 is a diagram for illustrating an exemplary method of calculating an estimation error of a capacity of a battery.

FIG. 6 is a diagram for illustrating an exemplary method of calculating capacity estimation error $\varepsilon$ of battery 50. In FIG. 6, the abscissa represents the start SOC and the ordinate represents capacity estimation error $\varepsilon$.

With conditions defined by combination (Δt, SOC1, and TB) of left-stand time period Δt, the start SOC (SOC1), and battery temperature TB being variously changed, full charge capacity C under each condition is measured. FIG. 6 shows an error in calculation of full charge capacity C (=capacity estimation error ε) when left-stand time period Δt is varied between two options (one minute or sixty minutes) and the start SOC is variously changed within a range from 0% to 85% at one battery temperature TB (30° C. in this example). By measuring full charge capacity C of a plurality of batteries placed under the same condition, an error in calculation of full charge capacity C under that condition can be calculated. Since full charge capacity C and capacity retention Q are in proportion to each other (see the expression (1) above), the error in calculation of full charge capacity C matches with capacity estimation error ε. Therefore, capacity estimation error ε under each condition can be found by measurement above.

As shown in FIG. 6, when the start SOC is included in an intermediate SOC region (a region of the SOC from approximately 30% to 70% in the example shown in FIG. 6), capacity estimation error ε is larger than in an example where the start SOC is included in a low SOC region (a region of the SOC lower than 30%). This is because of a typical shape of the OCV-SOC curve, that is, such a shape that the inclination of the curve is steep in the low SOC region whereas it is flat in the intermediate SOC region. Because of this shape of the curve, in the intermediate SOC region as compared with the low SOC region, a slight error in OCV leads to a large SOC error. Then, an error in calculation of full charge capacity C is larger, and consequently capacity estimation errors is larger (see the expressions (1) and (2) above).

In general, the battery is polarized by charging and discharging. Polarization produced in battery 50 causes deviation of voltage VB representing a voltage across terminals (a closed circuit voltage (CCV)) of battery 50 from the OCV and generation of the OCV error. Polarization remains without being canceled until lapse of a certain time period (approximately several ten minutes) after end of charging and discharging of battery 50. Therefore, when left-stand time period Δt of battery 50 is short (one minute in the example shown in FIG. 6), accuracy of the OCV is lower than in an example where left-stand time period Δt is long (sixty minutes). Then, an error in SOC is generated and an error in calculation of full charge capacity C is larger. Namely, capacity estimation error ε is larger.

Though not shown, under such a condition that both of the start SOC of battery 50 and left-stand time period Δt are equal, polarization is less likely to be canceled as battery temperature TB is lower. Therefore, as battery temperature. TB is lower, the error in OCV is larger and hence capacity estimation error ε is larger.

Capacity estimation error c of battery 50 is thus dependent on the start SOC of battery 50, left-stand time period Δt, and battery temperature TB. Therefore, capacity estimation error ε can be calculated based on these three parameters. In the present embodiment, a map MP for calculation of capacity estimation error ε is prepared. Though FIG. 6 shows capacity estimation error ε with combination (Δt and SOC1) of left-stand time period Δt and the start SOC (SOC1) at specific battery temperature TB being varied, map MP can be prepared by calculating capacity estimation error ε with combination of the three parameters (Δt, SOC1, and TB) being varied.

Figures 7, 8:
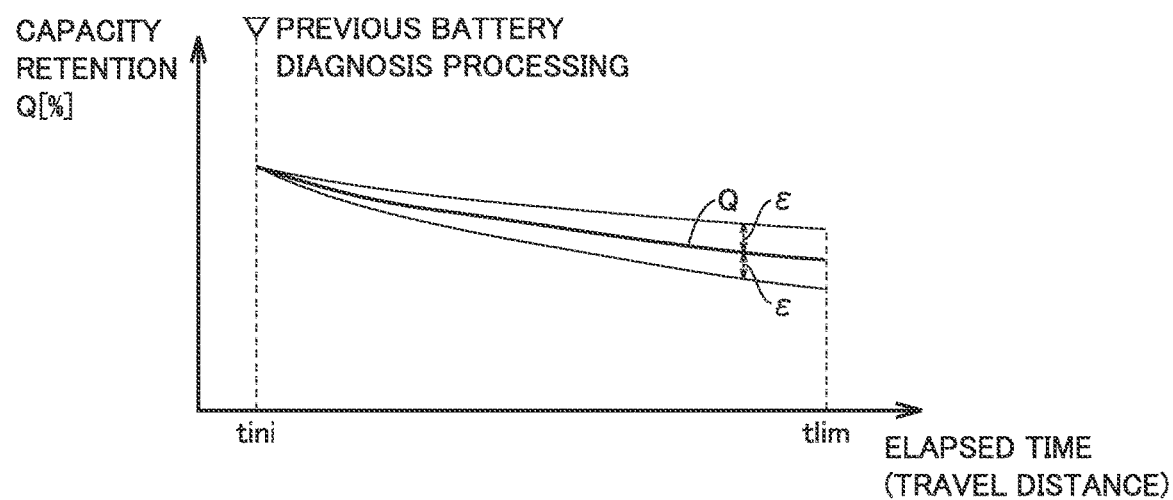
FIG. 7 is a conceptual diagram showing a map for calculating an estimation error of a capacity of the battery.
FIG. 8 is a diagram for illustrating a method of calculating a capacity retention and an estimation error of a capacity of the battery.

FIG. 7 is a conceptual diagram showing map MP for calculating capacity estimation error ε of battery 50. Referring to FIG. 7, a three-dimensional map MP for calculating capacity estimation error ε based on left-stand time period Δt of battery 50, the start SOC, and battery temperature TB is stored in a memory (not shown) of ECU 100. By referring to map MP, ECU 100 can calculate capacity estimation error ε based on the three parameters.

For example, when battery 50 is not charged or discharged due to vehicle 1 remaining stopped, capacity retention Q (and capacity estimation error ε) cannot be calculated by performing calculation processing. In this case, an estimated value of capacity retention Q obtained in previous calculation processing and a calculated value of capacity estimation error ε can be used as results of processing in S106 and S107. When a long time period (for example, several months) have elapsed since previous calculation processing, however, deterioration of battery 50 may progress and capacity retention Q and capacity estimation error ε may vary also during that period. In such a case, current capacity retention Q and capacity estimation error ε are calculated as below.

FIG. 8 is a diagram for illustrating a method of calculating capacity retention Q and capacity estimation error ε of battery 50. In FIG. 8, the abscissa represents elapsed time and the ordinate represents capacity retention Q of battery 50.

As shown in FIG. 8, as the time elapsed since previous calculation processing is longer, capacity retention Q is lower and an error of capacity retention Q (capacity estimation error ε) is larger. Therefore, correlation of time elapsed since previous calculation processing with capacity retention Q and capacity estimation error ε is found through experiments in advance, and a map (not shown) based on results of the experiments is prepared. By thus referring to the map, capacity retention Q and capacity estimation error ε can be calculated based on the time elapsed since previous calculation processing.

<<Representation Processing>>

Figure 9:
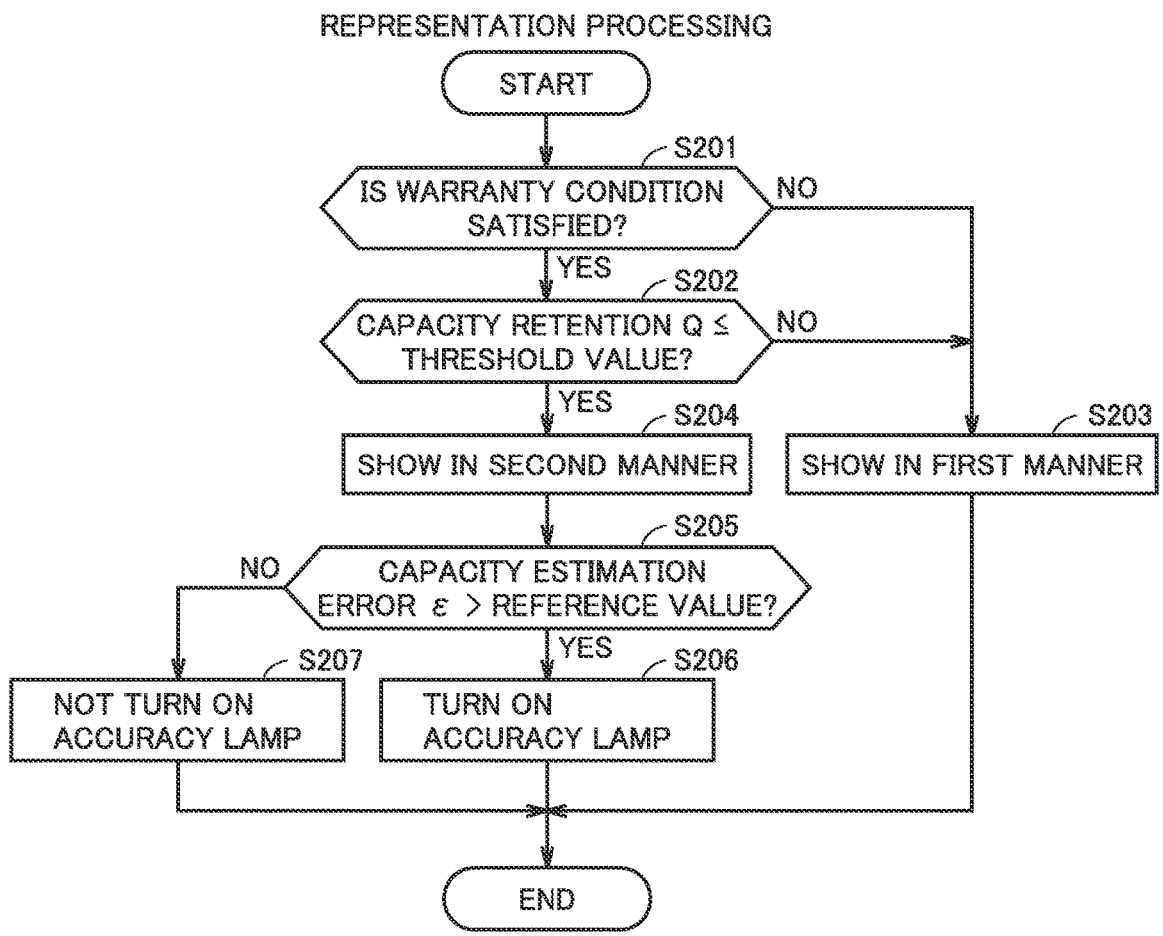
FIG. 9 is a flowchart showing representation processing in the embodiment.

FIG. 9 is a flowchart showing representation processing in the present embodiment. This flowchart is performed by ECU 100 following the calculation processing.

In S201, ECU 100 determines whether or not the warranty condition is satisfied. Specifically, ECU 100 determines whether or not the warranty period has elapsed and the travel distance of vehicle 1 has exceeded the warranty distance. When the warranty condition is satisfied (YES in S201), the process proceeds to S202. When the warranty condition is not satisfied (NO in S201), the process proceeds to S203.

In S202, ECU 100 determines whether or not capacity retention Q estimated in calculation processing is equal to or lower than the threshold value. When capacity retention Q is equal to or lower than the threshold value (YES in S202), ECU 100 allows the process to proceed to S204. When capacity retention Q is higher than the threshold value (NO in S202), ECU 100 allows the process to proceed to S203.

In S203, ECU 100 sets a manner of representation of segments to a first manner and turns on segments in accordance with capacity retention Q. Specifically, ECU 100 sets the color of illumination of segments, for example, to blue, and turns on segments in accordance with capacity retention Q. Then, ECU 100 performs S203 and thereafter quits the process.

In S204, ECU 100 sets the manner of representation of the segments to a second manner and turns on segments in accordance with capacity retention Q. Specifically, ECU 100 sets the color of illumination of segments, for example, to red, and turns on segments in accordance with capacity retention Q. When the warranty condition is satisfied and capacity retention Q is equal to or lower than the threshold value, by varying the manner of representation of the segments (varying the color of illumination), the user is allowed to intuitively recognize eligibility for receiving the warranty battery service. In S204, instead of or in addition to setting of the manner of representation of the segments to the second manner, ECU 100 may turn on warranty lamp 75. By doing so as well, the user can intuitively recognize eligibility for receiving the warranty battery service.

In S205 that follows, ECU 100 determines whether or not an error of capacity retention Q (capacity estimation error ε) estimated in calculation processing has exceeded the reference value. When capacity estimation error ε has exceeded the reference value (YES in S205), ECU 100 allows the process to proceed to S206. When capacity estimation error ε is equal to or lower than the reference value (NO in S205), ECU 100 allows the process to proceed to S207.

In S206, ECU 100 turns on the accuracy lamp in third display section 78. Thus, the user can recognize low accuracy in estimation of capacity retention Q shown on multi-information display 74.

In S207, ECU 100 turns off the accuracy lamp in third display section 78. Thus, the user can recognize high accuracy in estimation of capacity retention Q shown on multi-information display 74.

As set forth above, in the present embodiment, when deterioration of battery 50 progresses and the battery is now eligible for receiving the warranty battery service, a notification that the battery is eligible for receiving the warranty battery service is given. Specifically, when the warranty condition is satisfied and capacity retention Q is equal to or lower than the threshold value, a notification that capacity retention Q is equal to or lower than the threshold value is given. By giving the notification that capacity retention Q is equal to or lower than the threshold value, even though the user is unfamiliar with capacity retention Q, the user can intuitively recognize eligibility for receiving the warranty battery service.

More specifically, when capacity retention Q is higher than the threshold value (for example, the capacity retention of 30%), capacity retention Q is shown in the first manner (the color of illumination of segments being set, for example, to blue). When capacity retention Q is equal to or lower than the threshold value while the warranty condition, is satisfied, capacity retention Q is shown in the second manner (the color of illumination of segments being set, for example, to red). Thus, as the manner of representation of capacity retention Q is varied from the first manner to the second manner when the battery has become eligible for receiving the warranty battery service, the user can intuitively recognize eligibility for receiving the warranty battery service even though the user is unfamiliar with capacity retention Q.

When the warranty condition is not satisfied even though capacity retention Q is equal to or lower than the threshold value, capacity retention Q is shown in the first manner. If a notification that capacity retention Q is equal to or lower than the threshold value is given even when the warranty condition is no longer satisfied, the user may erroneously recognize eligibility for receiving the warranty battery service or may feel bothered by the notification given in spite of ineligibility for receiving the warranty battery service. When the warranty condition is not satisfied, capacity retention Q is shown in the first manner so that erroneous recognition by the user caused by the notification or the user being bothered by the notification can be suppressed.

Ease in control may be prioritized. Specifically, regardless of whether or not the warranty condition is satisfied, capacity retention Q may be shown in the first manner when capacity retention Q is higher than the threshold value, and capacity retention Q may be shown in the second manner when capacity retention Q is equal to or lower than the threshold value.

When deterioration of battery 50 progresses and the battery is now eligible for receiving the warranty battery service, a notification about eligibility for receiving the warranty battery service may be given by turning on warranty lamp 75. With turn-on of warranty lamp 75, even though the user is unfamiliar with capacity retention Q, the user can intuitively recognize eligibility for receiving the warranty battery service.

When deterioration of battery 50 progresses and the battery is now eligible for receiving the warranty battery service, capacity retention Q may be shown in the second manner and warranty lamp 75 may be turned on. Thus, even though the user is unfamiliar with capacity retention Q, the user can more intuitively recognize eligibility for receiving the warranty battery service.

When an error of capacity retention Q (capacity estimation error ε) is larger than the reference value, the accuracy lamp in third display section 78 is turned on. The user can thus recognize low accuracy in estimation of shown capacity retention Q.

Though an example in which capacity retention Q is shown in vehicle 1 (instrument panel 70 and/or car navigator 80) is described above, capacity retention Q may be shown, for example, on service tool 4. In this case, display 402 of service tool 4 corresponds to an exemplary "display apparatus" according to the present disclosure. Control unit 404 of service tool 4 corresponds to an exemplary "controller" according to the present disclosure. Furthermore, capacity retention Q may be shown on smartphone 5. In this case, touch panel display 502 of smartphone 5 corresponds to an exemplary "display apparatus" according to the present disclosure. Control unit 503 of smartphone 5 corresponds to an exemplary "controller" according to the present disclosure.

Though an example in which capacity retention Q can selectively be shown on multi-information display 74 is described in the present embodiment, capacity retention Q may always be shown on instrument panel 70 separately from multi-information display 74. In this case, for example, when capacity retention Q is shown with segments, the segments may physically be provided or virtually provided as in the embodiment.

In the present embodiment, the threshold value is set for determining eligibility for receiving the warranty battery service. The threshold value, however, can also be set from a different point of view. For example, the threshold value may be set for determining whether or not battery 50 is reusable. Namely, the threshold value may be set for determining whether or not battery 50 is worth a secondhand battery. By thus setting the threshold value, the user can visually recognize whether or not battery 50 is reusable at the current time point.

[First Modification]

In the embodiment, when deterioration of battery 50 progresses and the battery is now eligible for receiving the warranty battery service, a notification about eligibility for receiving the warranty battery service is given by varying the color of illumination of segments. A notification about eligibility for receiving the warranty battery service, however, may be given in another manner.

Figure 10:
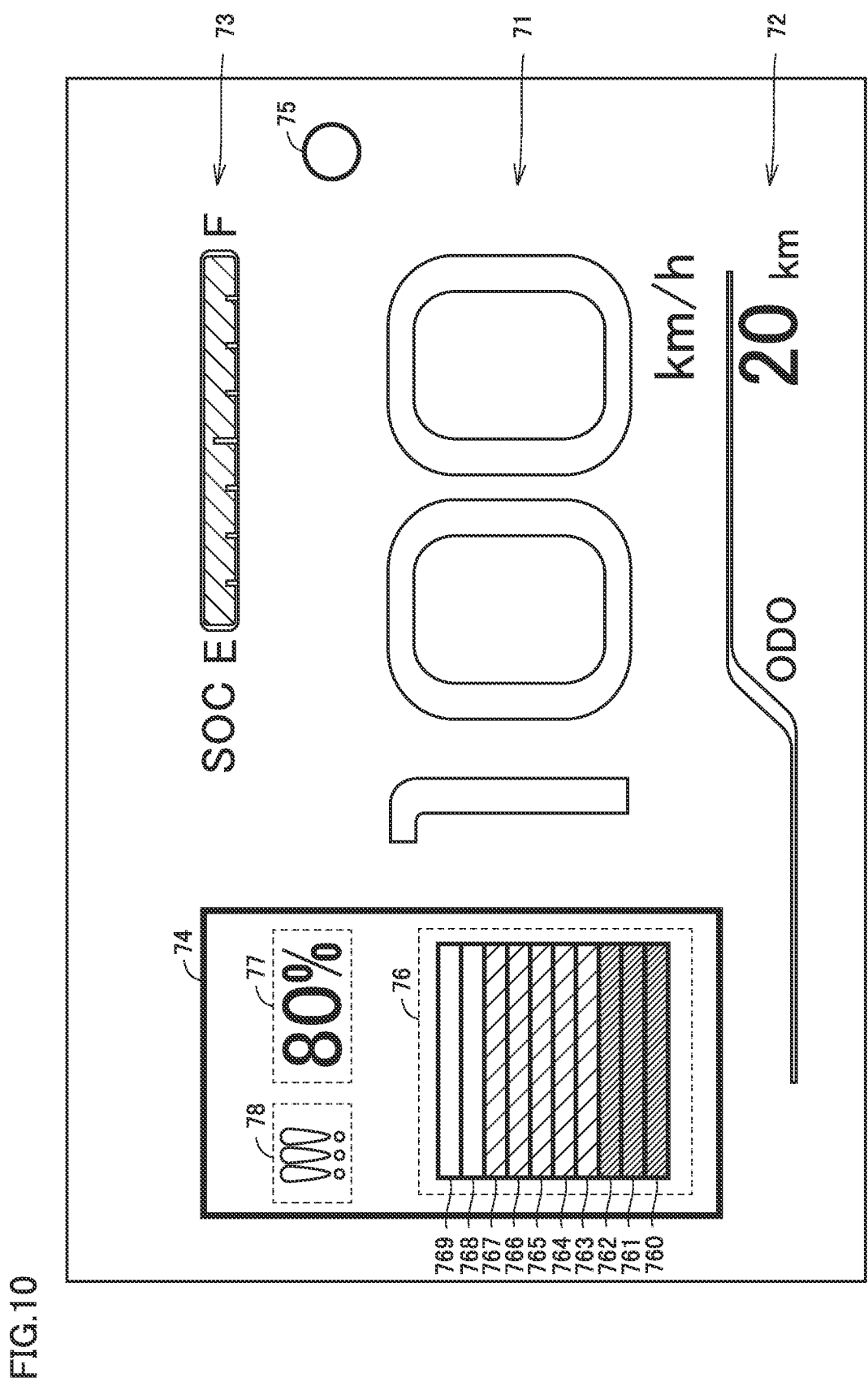
FIG. 10 is a diagram showing an example where a capacity retention is shown on the multi-information display in a first modification.

FIG. 10 is a diagram showing an example where capacity retention Q is shown on multi-information display 74 in a first modification. In the first modification, regardless of eligibility for receiving the warranty battery service, segments 763 to 769 corresponding to capacity retention Q higher than the threshold value and segments 760 to 762 corresponding to capacity retention Q equal to or lower than the threshold value are turned on in colors different from each other.

FIG. 10 shows exemplary representation when capacity retention Q is 80%. For example, segments 768 to 769 are turned off, segments 763 to 767 are turned on in blue, and segments 760 to 762 are turned on in red. For example, when capacity retention Q is equal to or lower than 30%, segments 763 to 769 are turned off and segments 760 to 762 are turned on. In this case, as the segments that are turned on are in a red color alone, the user can visually recognize change from the state that segments were turned on also in blue in addition to red. Namely, the user can recognize variation in manner of representation of capacity retention. With variation in manner of representation of capacity retention Q, the user can intuitively recognize eligibility for receiving the warranty battery service.

[Second Modification]

Figure 11:
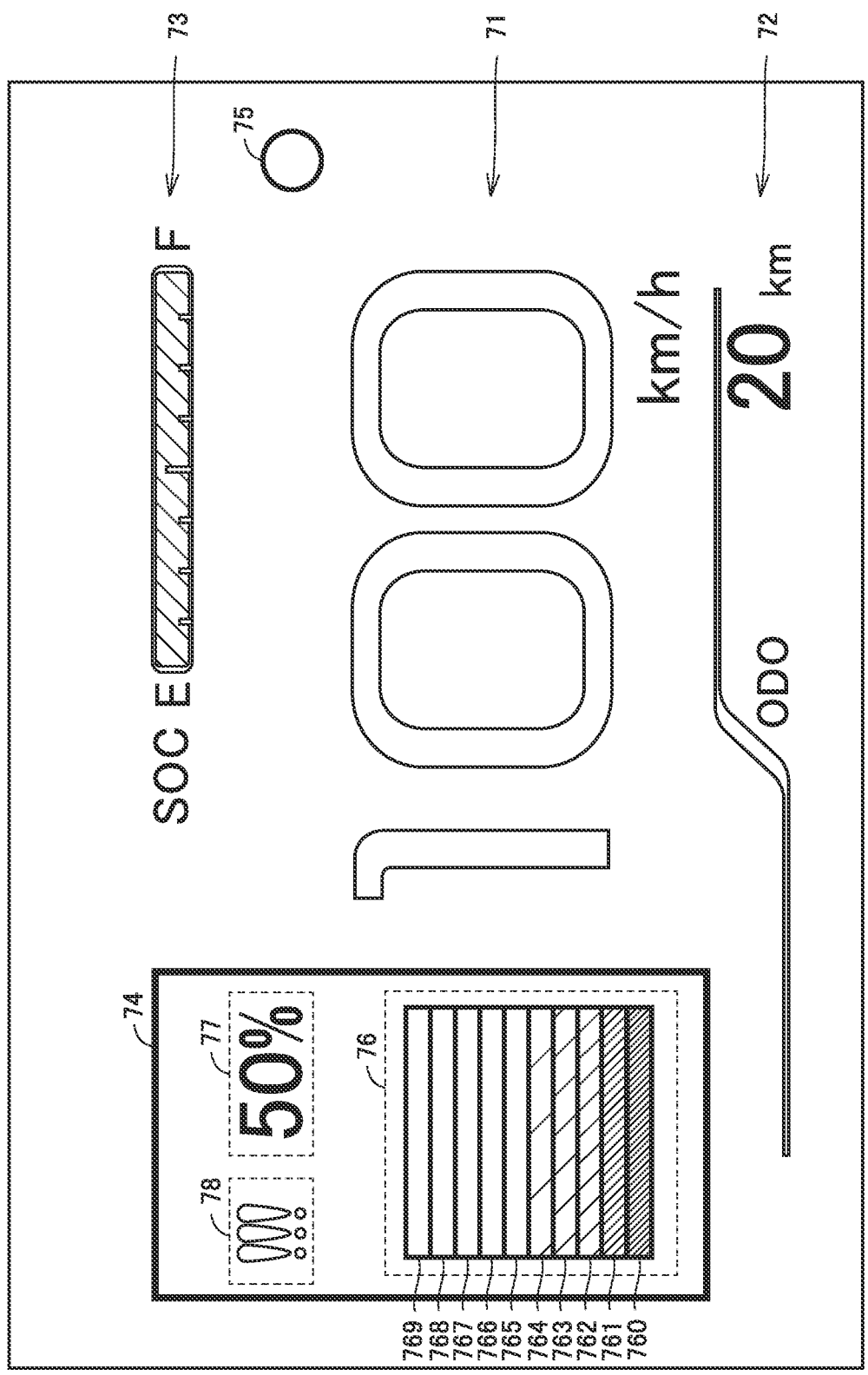
FIG. 11 is a diagram showing an example where a capacity retention is shown on the multi-information display in a second modification.

In a second modification, yet another example of a notification about eligibility for receiving the warranty battery service will be described. FIG. 11 is a diagram showing an example where capacity retention Q is shown on multi-information display 74 in the second modification. In the second modification, a color of illumination of segments in first display section 76 are different in density. Specifically, segments 760 to 769 are set such that the color of illumination thereof becomes lighter in this order. Specifically, among segments 760 to 769, segment 760 is highest and segment 769 is lowest in density of the color of illumination.

FIG. 11 shows exemplary representation when capacity retention Q is 50%. When transition from the state shown in FIG. 11 to capacity retention Q, for example, of 30% is made, segments 763 to 769 are turned off and segments 760 to 762 are turned on. In this case, only segments in a relatively dense illumination color are turned on so that the user can visually recognize variation in manner of representation. With variation in manner of representation of capacity retention Q, the user can intuitively recognize eligibility for receiving the warranty battery service.

[Third Modification]

Figure 12:
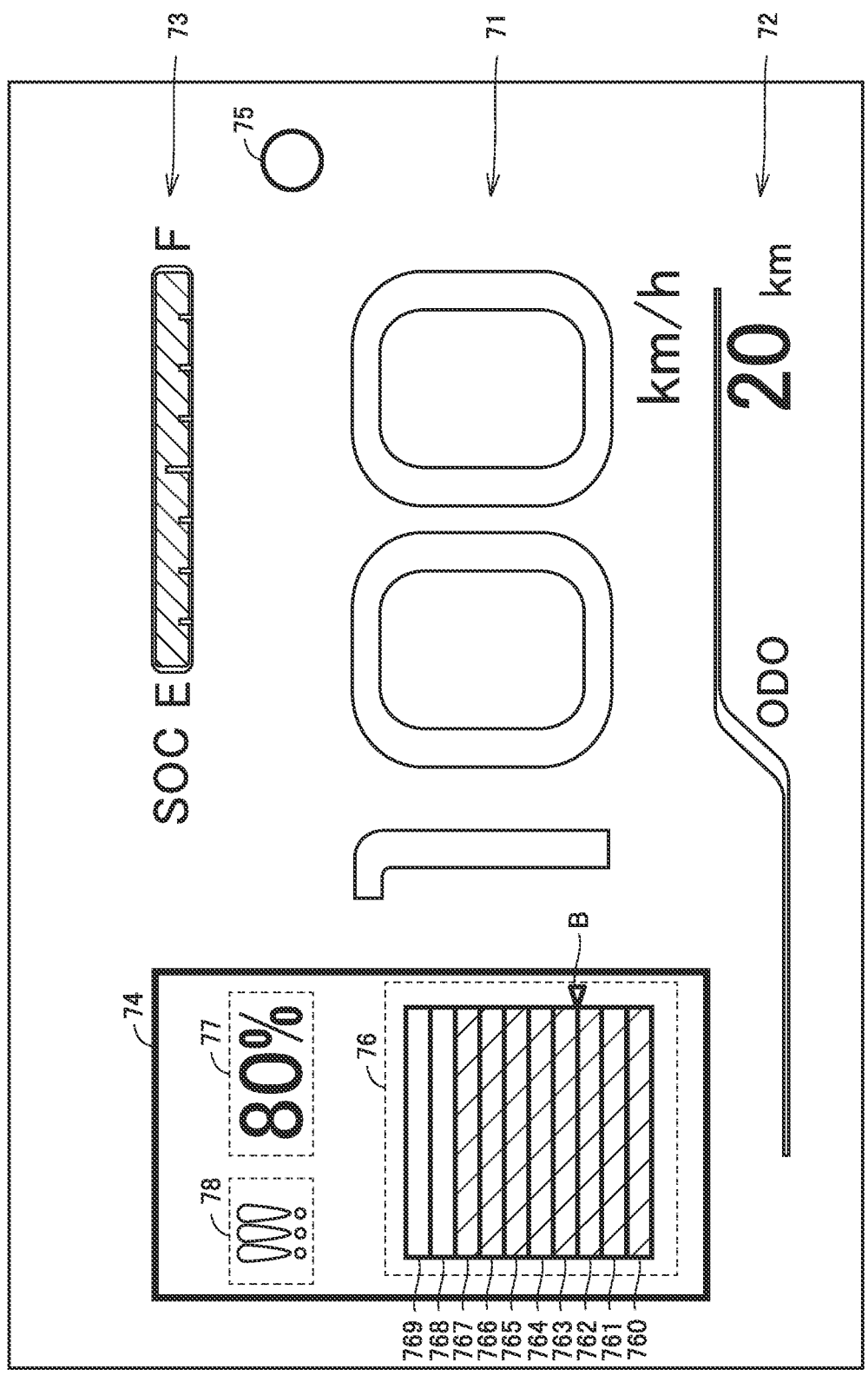
FIG. 12 is a diagram showing an example where a capacity retention is shown on the multi-information display in a third modification.

In a third modification, yet another example of a notification about eligibility for receiving the warranty battery service will be described. FIG. 12 is a diagram showing an example where capacity retention Q is shown on multi-information display 74 in the third modification. A mark B that indicates the threshold value in addition to segments 760 to 769 is further shown in first display section 76 according to the third modification.

With representation of mark B indicating the threshold value, when segments that are turned on are lower than mark B, the user can recognize eligibility for receiving the warranty battery service. In the example shown in FIG. 12, with representation of mark B, when transition of segment 763 from on to off is made, that is, when segment 762 is the uppermost segment that is turned on, the user recognizes that the segment that is turned on is lower than mark B. With representation of mark B indicating the threshold value in addition to segments 760 to 769, the user can intuitively recognize eligibility for receiving the warranty battery service.

[Fourth Modification]

A warranty condition may be shown on multi-information display 74. A warranty condition may be shown together with capacity retention Q, or may selectively be shown on multi-information display 74 like a driving range, an average vehicle speed, and a state of regeneration/power running of battery 50. In a fourth modification, an example where the warranty condition is shown together with capacity retention Q will be described.

Figure 13:
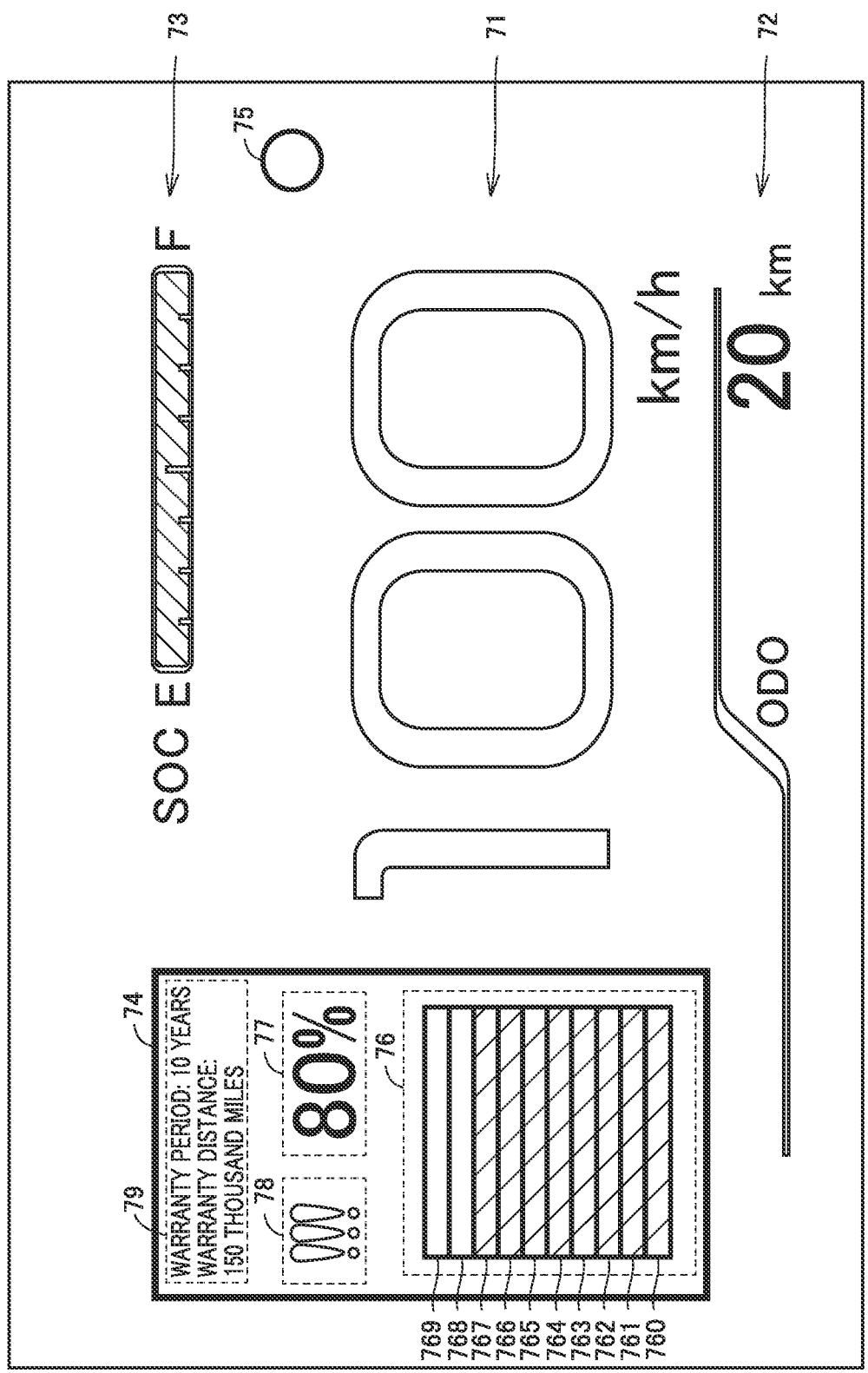
FIG. 13 is a diagram showing an example where a capacity retention and a warranty condition are shown on the multi-information display.

FIG. 13 is a diagram showing an example where capacity retention Q and a warranty condition are shown on multi-information display 74. Multi-information display 74 further includes a fourth display section 79 in addition to first display section 76, second display section 77, and third display section 78.

A warranty condition is shown in fourth display section 79. Specifically, a warranty period and a warranty distance are shown in fourth display section 79. FIG. 13 shows ten years as the warranty period and one hundred and fifty thousand miles as the warranty distance.

Representation of the warranty condition is not limited to representation of the warranty condition itself (the warranty period and the warranty distance themselves). For example, days that remain at the current time point may be shown as the warranty period. The last day of the warranty period (an expiration date of the warranty period) may be shown as the warranty period. A distance that remains at the current time point may be shown as the warranty distance. With representation of the warranty condition, the user can recognize the warranty condition. Therefore, expiration of the warranty period or excess of the travel distance of vehicle 1 over the prescribed distance without receiving the warranty service in spite of eligibility for receiving the warranty battery service can be suppressed. The warranty condition (including the modification above) shown in fourth display section 79 corresponds to an exemplary "second indicator" according to the present disclosure.

When the warranty condition is no longer satisfied, that is, the warranty period has expired or the travel distance of vehicle 1 has exceeded the warranty distance, a notification that the warranty condition is no longer satisfied may be given.

For example, by causing the warranty condition shown in fourth display section 79 to blink or varying a color of representation thereof, a notification that the warranty condition is no longer satisfied is given. For example, when the warranty period has expired, the warranty period shown in fourth display section 79 is caused to blink. The user can thus recognize that the warranty condition is no longer satisfied due to expiration of the warranty period. For example, when the travel distance of vehicle 1 exceeds the warranty distance, the warranty distance shown in fourth display section 79 is caused to blink.

For example, a notification that the warranty condition is no longer satisfied may be given by showing a character indicating that the warranty condition is no longer satisfied.

[Fifth Modification]

An example where segment representation of capacity retention Q is provided in first display section 76 of multi-information display 74 is described in the embodiment and the first to fourth modifications. Limitation to segment representation of capacity retention Q in first display section 76, however, is not intended. In a fifth modification, an example where capacity retention Q is shown in another manner in first display section 76 will be described.

Figure 14:
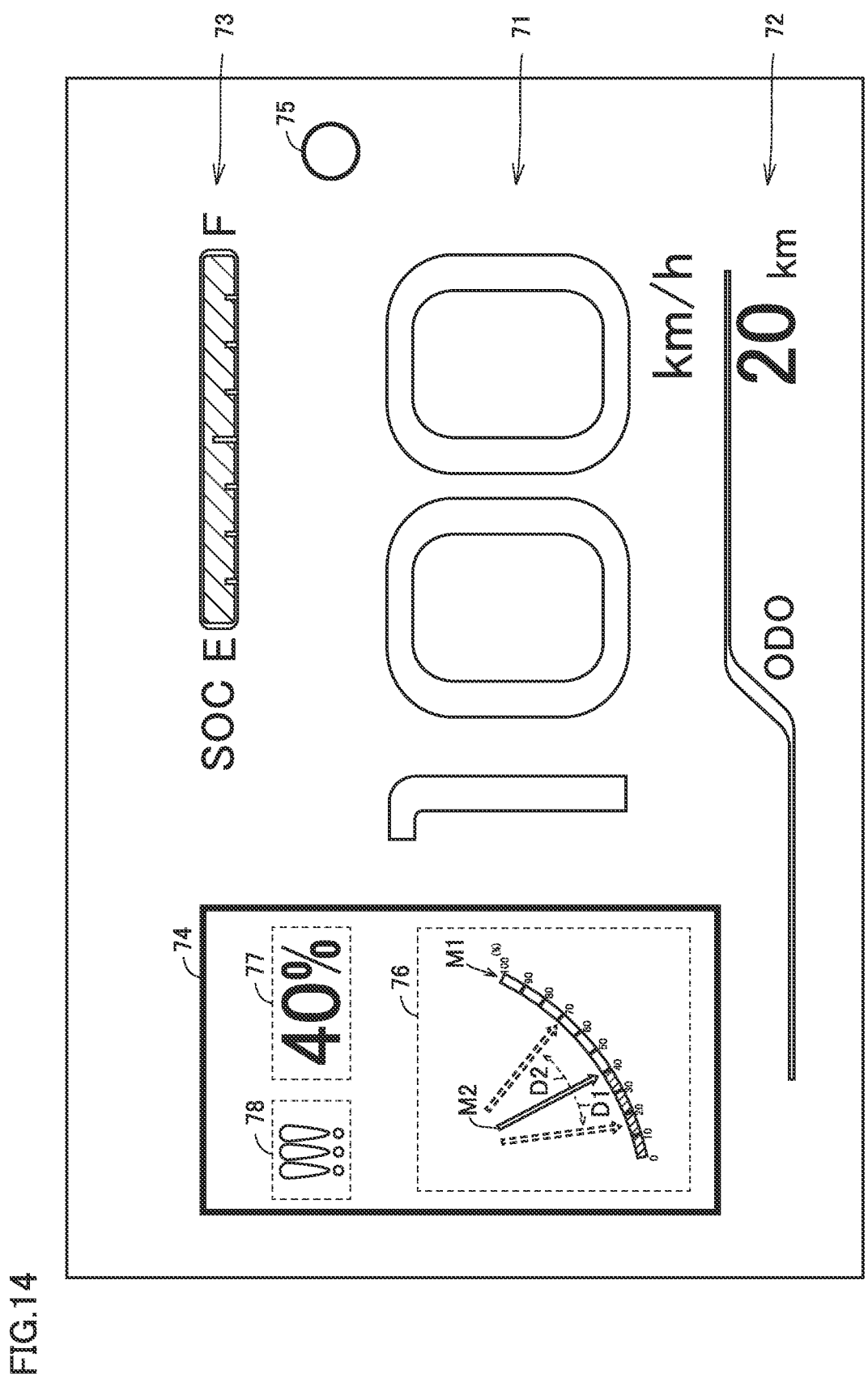
FIG. 14 is a diagram showing an example where a capacity retention is shown on the multi-information display in another manner.

FIG. 14 is a diagram showing an example where capacity retention Q is shown on multi-information display 74 in another manner. Referring to FIG. 14, first display section 76 includes a scale M1 and a needle M2. First display section 76 shows capacity retention Q of battery 50 with scale M1 and needle M2. Capacity retention Q is pointed to by needle M2. A numeric value provided to scale M1 specifies a value pointed to by needle M2 (that is, capacity retention Q pointed to by needle M2). As shown in FIG. 14, needle M2 is shown to continuously move in a direction D1 and a direction D2.

FIG. 14 shows an example where capacity retention Q is 40%. In the fifth modification, scale M1 corresponding to current capacity retention Q is shown to illuminate. Until capacity retention Q is equal to or lower than the threshold value, for example, scale M1 is shown to illuminate in blue. When capacity retention Q is equal to or lower than the threshold value while the warranty condition is satisfied, the color of illumination of scale M1 is changed to red. When battery 50 is now eligible for receiving the warranty service, the color of illumination of scale M1 is varied. The user can thus visually recognize variation in representation. Therefore, the user can intuitively recognize eligibility for receiving the warranty battery service.

[Sixth Modification]

In the fifth modification, the color of illumination of scale M1 is varied when the battery is now eligible for receiving the warranty battery service. In a sixth modification, an example where a color of illumination of needle M2 is varied when the battery is now eligible for receiving the warranty battery service will be described.

Figure 15:
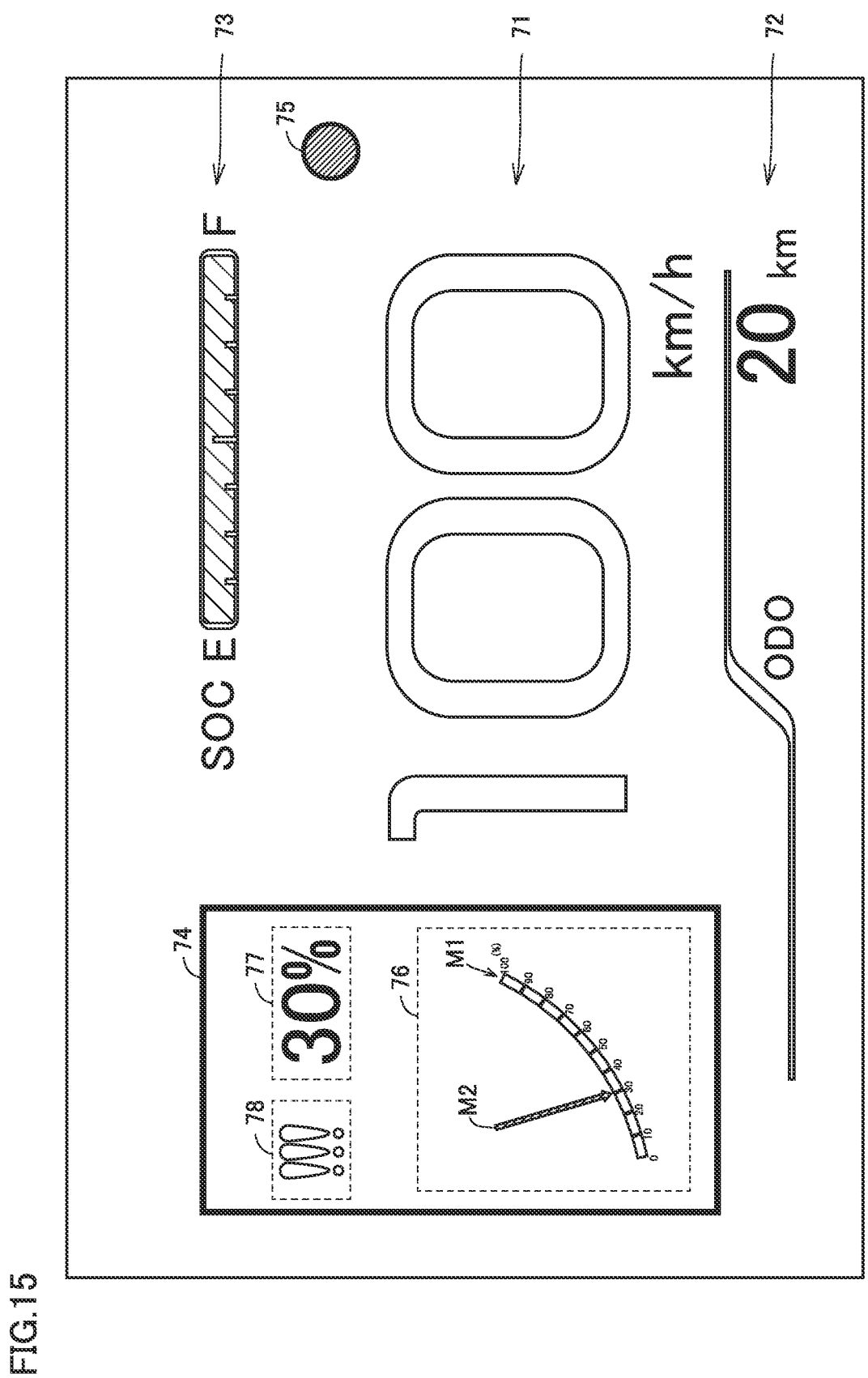
FIG. 15 is a diagram showing another example where a capacity retention is shown on the multi-information display in another manner.

FIG. 15 is a diagram showing another example where capacity retention Q is shown on multi-information display 74 in another manner. When the battery is now eligible for receiving the warranty battery service, the color of illumination of needle M2 is varied. For example, when the battery is now ineligible for receiving the warranty battery service, needle M2 may be turned on in blue, and when the battery is now eligible for receiving the warranty battery service, needle M2 may be turned on in red. When the battery is now eligible for receiving the warranty battery service, the color of illumination of needle M2 is varied. The user can thus visually recognize variation in representation. Therefore, the user can intuitively recognize eligibility for receiving the warranty battery service.

[Seventh Modification]

In the embodiment and the first to sixth modifications, the color of illumination of segments, the color of illumination of scale M1, or the color of illumination of needle M2 is varied between a state of ineligibility for receiving the warranty battery service and a state of eligibility for receiving the warranty battery service.

As described above, the state of ineligibility for receiving the warranty battery service is that (1) the warranty condition is satisfied and capacity retention Q is higher than the threshold value or (2) the warranty condition is not satisfied. When (2) the warranty condition is not satisfied, segments, scale M1, or needle M2 may be turned on in yet another color.

In summary, in the case of (1) above, in the case of (2) above, and in a case of (3) where the warranty condition is satisfied and capacity retention Q is equal to or lower than the threshold value (the state of eligibility for receiving the warranty battery service), segments, scale M1, or needle M2 may be turned on in different colors. The user can thus recognize in which state battery 50 is in.

The embodiment and the first to seventh, modifications may be carried out with all or some of them being combined.

Though an embodiment of the present disclosure has been described, it should be understood that the embodiment disclosed herein is illustrative and non-restrictive in every respect. The scope of the present disclosure is defined by the terms of the claims and is intended to include any modifications within the scope and meaning equivalent to the terms of the claims.

What is claimed is:

1. A display system comprising:
    a display apparatus that shows a first indicator relating to a full charge capacity of a secondary battery; and
    a controller that controls the display apparatus, wherein
    the controller controls the display apparatus to notify, when a full charge capacity of the secondary battery is equal to or lower than a threshold value, that the full charge capacity of the secondary battery is equal to or lower than the threshold value,
    wherein the controller controls the display apparatus to notify, when an estimation error of the full charge capacity of the secondary battery exceeds a reference value, that accuracy of the first indicator is low.

2. The display system according to claim 1, wherein
    the controller controls the display apparatus to notify that the full charge capacity of the secondary battery is equal to or lower than the threshold value by varying a manner of representation of the first indicator.

3. The display system according to claim 1, wherein
    the controller controls the display apparatus to notify that the full charge capacity of the secondary battery is equal to or lower than the threshold value by showing a warning.

4. The display system according to claim 1, wherein
    the display apparatus shows a capacity retention in segment representation as the first indicator, the capacity retention representing a ratio of a current full charge capacity to an initial full charge capacity of the secondary battery, and
    the controller
        controls the display apparatus to turn on segments corresponding in number to the capacity retention, and
        controls the display apparatus to vary a color of at least one of the segments when the full charge capacity of the secondary battery is equal to or lower than the threshold value.

5. The display system according to claim 1, wherein
    the controller
        controls the display apparatus to notify that the full charge capacity of the secondary battery is equal to or lower than the threshold value when a warranty condition is satisfied, and
        controls the display apparatus not to notify that the full charge capacity of the secondary battery is equal to or lower than the threshold value when the warranty condition is not satisfied.

6. The display system according to claim 5, wherein
    the warranty condition is satisfied when a prescribed period has not elapsed since start of use of the secondary battery.

7. The display system according to claim 5, wherein
    the warranty condition is satisfied when a travel distance of a vehicle incorporating the secondary battery is shorter than a prescribed distance.

8. The display system according to claim 5, wherein
    the warranty condition is satisfied when a prescribed period has not elapsed since start of use of the secondary battery and when a travel distance of a vehicle incorporating the secondary battery is shorter than a prescribed distance.

9. The display system according to claim 1, wherein the controller controls the display apparatus to notify, when a warranty condition is not satisfied, that the warranty condition is not satisfied.

10. The display system according to claim 5, wherein the controller controls the display apparatus to notify, when the warranty condition is not satisfied, that the warranty condition is not satisfied.

11. The display system according to claim 1, wherein the controller controls the display apparatus to show a second indicator relating to a warranty condition.

12. The display system according to claim 5, wherein the controller controls the display apparatus to show a second indicator relating to the warranty condition.

13. A vehicle comprising:
the secondary battery; and
the display system according to claim 1.

14. A method of showing a state of a secondary battery by showing a first indicator relating to a full charge capacity of the secondary battery, the method comprising:
obtaining a full charge capacity of the secondary battery;
notifying, when the full charge capacity of the secondary battery is equal to or lower than a threshold value, that the full charge capacity of the secondary battery is equal to or lower than the threshold value; and
notifying, when an estimation error of the full charge capacity of the secondary battery exceeds a reference value, that accuracy of the first indicator is low.

* * * * *